United States Patent [19]

Gibson et al.

[11] 4,409,186
[45] Oct. 11, 1983

[54] CATALYST PARTICLE SIZING APPARATUS

[75] Inventors: William A. Gibson; Ting C. Ho, both of Orange, Tex.

[73] Assignee: Gulf Oil Corporation, Pittsburgh, Pa.

[21] Appl. No.: 347,838

[22] Filed: Feb. 11, 1982

[51] Int. Cl.³ .............................................. C08F 4/00
[52] U.S. Cl. .................................. 422/131; 209/235; 209/283; 209/300; 209/380; 209/390; 422/310
[58] Field of Search ................ 422/131, 310; 209/235, 209/278, 280, 283, 300, 306, 380, 390; 526/904; 252/410, 411 R, 477

[56] References Cited

U.S. PATENT DOCUMENTS

| | | | |
|---|---|---|---|
| 676,645 | 6/1901 | Arnold | 209/283 |
| 1,584,077 | 5/1926 | Carter | 209/283 |
| 2,118,309 | 5/1938 | Johnson | 209/283 X |
| 2,885,246 | 5/1959 | De Haven | 422/131 X |
| 2,886,616 | 5/1959 | Mertz et al. | 422/131 X |
| 3,011,220 | 12/1961 | Keller et al. | 209/283 X |
| 3,249,220 | 5/1966 | Bakke | 209/283 X |
| 3,779,712 | 12/1973 | Calvert et al. | 422/131 X |
| 4,021,599 | 5/1977 | Kochhar et al. | 526/904 X |
| 4,089,777 | 5/1978 | Macaulay et al. | 209/300 X |

*Primary Examiner*—Richard L. Chiesa
*Attorney, Agent, or Firm*—Deane E. Keith; Forrest D. Stine; Richard C. Gaffney

[57] ABSTRACT

Apparatus is provided to size finely divided catalyst particles so that all of the catalyst particles passing through the apparatus are sized so as to have a maximum particle diameter. The apparatus includes:
(a) A sealed cylindrical housing having an arcuate opening cut into its lower surface,
(b) A fine mesh screen which overlaps the arcuate opening cut into the cylindrical housing,
(c) A hemicylindrical housing attached to the lower surface of the cylindrical housing and defining a cavity in communication with the cylindrical housing,
(d) An inlet port in the top center surface of the cylindrical housing,
(e) An outlet port in the bottom center surface of the hemicylindrical housing,
(f) A shaft rotating axially within the cylindrical housing and having brushes attached thereto which force catalyst particles from the cylindrical housing through the screen and break down catalyst agglomerates introduced into the cylindrical housing.

2 Claims, 3 Drawing Figures

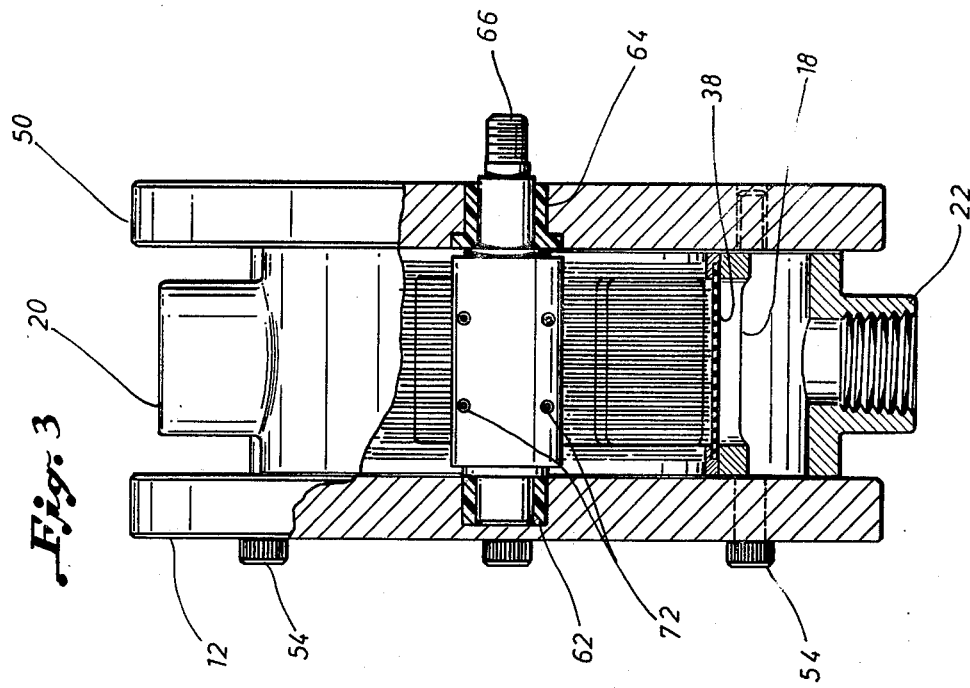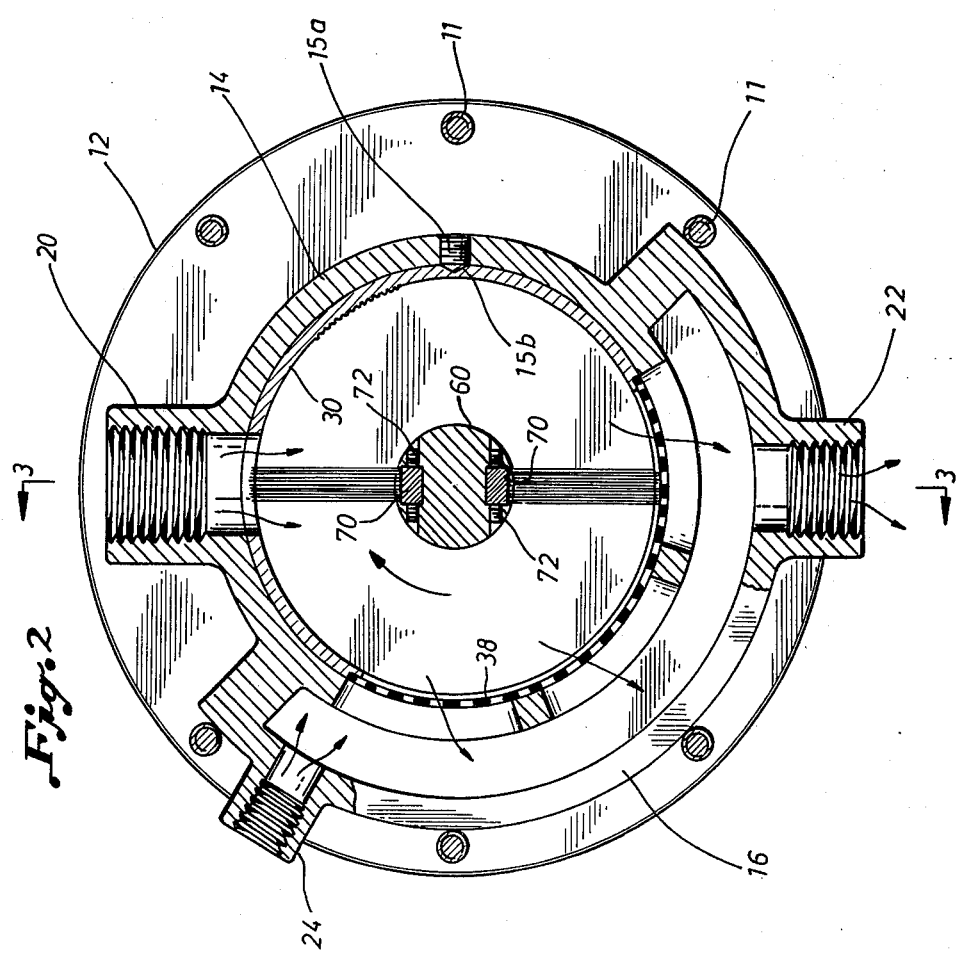

CATALYST PARTICLE SIZING APPARATUS

BACKGROUND OF THE INVENTION

There is a growing interest in the development of processes for polymerizing olefins such as ethylene and propylene in the vapor phase and in the absence of any liquid solvents. In carrying out such polymerizations, preformed particles of the desired olefin polymer are fluidized in a reactor by either gas flow or machanical means. Finely divided catalyst particles are introduced into the reactor to initiate polymerization of the vaporized monomer on the fluidized olefin polymer particles. In carrying out such processes, it is desirable to employ highly active catalysts to minimize the catalyst residues left in the polymers produced by such processes. Frequently the active catalysts employed are supported on fine particles of olefin polymer. A typical example of the type of catalysts employed is the magnesium chloride-modified, titanium containing catalyst of the type disclosed in U.S. Pat. No. 4,021,599.

In carrying out such polymerizations employing such solid catalysts, the catalyst feed line introducing the catalyst particles to the reactor must have very small internal diameters. Difficulties are sometimes encountered in feeding such catalysts to the polymerization reactor where oversized catalyst particles are introduced into the catalyst feed lines. It becomes a matter of considerable importance to have available catalyst particles of a highly homogeneous nature, all of which are smaller than a prescribed maximum diameter.

SUMMARY OF THE INVENTION

The apparatus of the invention sizes finely divided catalyst particles so that all of the catalyst particles passing through the apparatus are sized so as to have a maximum particle diameter. The apparatus also breaks down agglomerate of such catalyst particles to provide a maximum yield of catalyst particles of the desired particle size. The apparatus includes:

(a) A sealed cylindrical housing having an arcuate opening cut into its lower surface, (b) A fine mesh screen which overlaps the arcuate opening cut into the cylindrical housing, (c) A hemicylindrical housing attached to the lower surface of the cylindrical housing and defining a cavity in communication with the cylindrical housing, (d) An inlet port in the top center surface of the cylindrical housing, (e) An outlet port in the bottom center surface of the hemicylindrical housing, and (f) A shaft rotating axially within the cylindrical housing and having brushes attached thereto which force catalyst particles from the cylindrical housing through the screen and break down catalyst agglomerates introduced into the cylindrical housing.

BRIEF DESCRIPTION OF THE DRAWINGS

FIG. 2 is a sectional view of the assembled apparatus taken through line 2—2 of FIG. 1.

FIG. 3 is a partial sectional view of the apparatus taken through line 3—3 of FIG. 2.

DETAILED DESCRIPTION OF THE INVENTION

Figure 1:
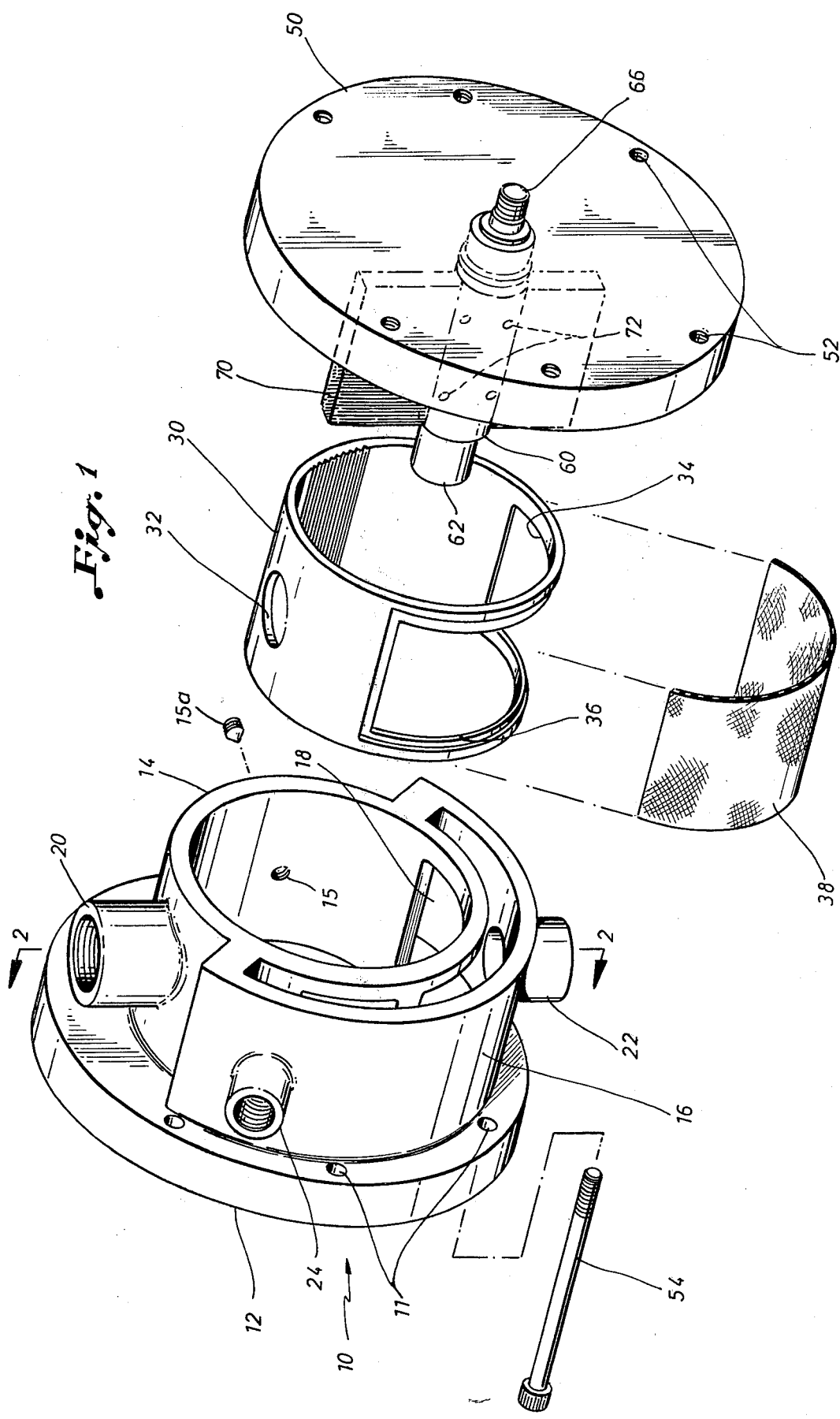
FIG. 1 is an exploded view of the particle sizing apparatus.

The apparatus has a main body member 10 which includes an integral face plate 12, a cylindrical housing 14, and a hemispherical housing 16. The housing 14 has an arcuate opening 18 cut into its lower surface which provides communication between housing 14 and hemispherical housing 16. A threaded port 20 is provided in the top center of housing 14. A threaded port 22 is provided in the bottom center of housing 16 and in direct line with port 20. Another threaded port 24 is provided in housing 16. A series of openings 11 are provided in face plate 12 for attaching body member 10 to face plate 50 by means of bolts 54. A threaded opening 15 is provided in the wall of housing 14.

A cylindrical liner 30 having a circular opening 32 and an arcuate opening 34 cut therein fits tightly into cylindrical housing 14. An undercut 36 is machined in the outer face of liner 30 adjacent to arcuate opening 34 to receive and hold an arcuate shaped screen 38 when liner 30 is inserted into housing 14. A set screw 15a is screwed through threaded opening 15 of housing 14 and fits into opening 15b machined into liner 30 to hold liner 30 in a fixed position within housing 14 so that its opening 32 is aligned with port 20 and its opening 34 is aligned with opening 18 of housing 14. Housings 14 and 16 are sealed by tightly attaching face plate 50 to main body member 10 by means of threaded bolts 54 which pass through the openings 11 of face plate 12 and seat in threaded openings 52 provided in face plate 50.

A shaft 60 is provided to rotate within housing 14 and is journaled into recesses 62 and 64 which are machined in face plates 12 and 50. The threaded end 66 of shaft 60 fits into a suitable drive mechanism such as gear box not shown. A pair of stiff but flexible brushes 70 are set into recesses cut into shaft 60 and are held in place by set screws 72. The brushes extend to the inner surface of housing 14 and sweep particles in housing 14 through the openings provided in screen 38.

In operation, a finely divided catalyst such as a magnesium chloride-modified, titanium containing catalyst supported on polyethylene particles is fed through entry port 20 into housing 14. As shaft 60 is rotated, brushes 70 sweep the catalyst particles along the inner wall of housing 14 and against screen 38. The fine catalyst particles fall through the openings in screen 38 and into housing 16. From housing 16, the catalyst particles fall through exit port 22 and into a suitable catalyst receiving container. Catalyst agglomerates too large to pass through the openings in screen 38 are subjected to a shearing action which breaks the agglomerates down into smaller particles which will pass through the openings in screen 38.

Over prolonged periods of operation, small quantities of fused agglomerates may build up within housing 14. To remove such agglomerates from the apparatus, port 22 is sealed, port 24 is attached to a source of an anhydrous inert gas such as nitrogen or argon, and port 20 is attached to a vacuum source. The vacuum applied draws inert gas into and through housings 16 and 14 and through port 20. This action sweeps the small agglomerates out of housing 14 and through port 20 to a suitable collection station.

The mesh size provided in screen 38 will depend, of course, upon the maximum diameter desired in the catalyst particles to be employed in the olefin polymerization. The apparatus of the invention can be employed with a catalyst receiving container to collect the sized catalyst particles discharged from port 22 of the apparatus. Alternatively, the apparatus of the invention can be employed in line with a polymerization reactor in which the sized catalyst particles from the apparatus are fed directly from the outlet port 22 of the apparatus to the catalyst feeding apparatus included in the polymerization reactor system.

What is claimed:

1. A particle sizing apparatus including in combination:
   (a) a cylindrical housing whose faces lie in the plane of gravity,
   (b) an arcuate opening cut into the lower surface of the cylindrical housing,
   (c) a fine mesh screen which overlaps the arcuate opening,
   (d) a hemicylindrical housing whose faces lie in the plane of gravity attached to the lower section of the cylindrical housing, and defining a cavity in communication therewith, the depth of the hemicylindrical housing being equal to the depth of the cylindrical housing,
   (e) an inlet in the top center surface of the cylindrical housing,
   (f) an outlet port in the bottom surface of the hemicylindrical housing,
   (g) a first face plate which overlaps and seals one face of each of the cylindrical housing and the hemicylindrical housing,
   (h) a second face plate which overlaps and seals the second face of each of the cylindrical housing and the hemicylindrical housing,
   (i) a shaft mounted axially within the cylindrical housing and rotatable therein,
   (j) brushes mounted on the shaft and extending to contact the entire inner surface of the cylindrical housing and the fine mesh screen fitted therein, and
   (k) means for rotating the shaft of.

2. Apparatus for polymerizing an olefin monomer in the vapor phase consisting essentially of:
   (a) a reactor for polymerizing olefin monomer in the vapor phase including means for fluidizing olefin polymer particles therein;
   (b) a catalyst feeder to feed finely divided catalyst particles to said reactor, and
   (c) particle sizing apparatus to feed catalyst particles having a preselected maximum particle diameter to said catalyst feeder;
   said particle sizing apparatus including in combination:
   (i) a cylindrical housing whose faces lie in the plane of gravity,
   (ii) an arcuate opening cut into the lower surface of the cylindrical housing,
   (iii) a fine mesh screen which overlaps the arcuate opening,
   (iv) a hemicylindrical housing whose faces lie in the plane of gravity attached to the lower section of the cylindrical housing, and defining a cavity in communication therewith, the depth of the hemicylindrical housing being equal to the depth of the cylindrical housing,
   (v) an inlet in the top center surface of the cylindrical housing,
   (vi) an outlet port in the bottom surface of the hemicylindrical housing,
   (vii) a first face plate which overlaps and seals one face of each of the cylindrical housing and the hemicylindrical housing,
   (viii) a second face plate which overlaps and seals the second face of each of the cylindrical housing and the hemicylindrical housing,
   (ix) a shaft mounted axially within the cylindrical housing and rotatable therein,
   (x) brushes mounted on the shaft and extending to contact the entire inner surface of the cylindrical housing and the fine mesh screen fitted therein, and
   (xi) means for rotating the shaft.

* * * * *